June 1, 1926.
A. H. MILLER
RADIODETECTOR
Filed Nov. 26, 1923
1,586,828
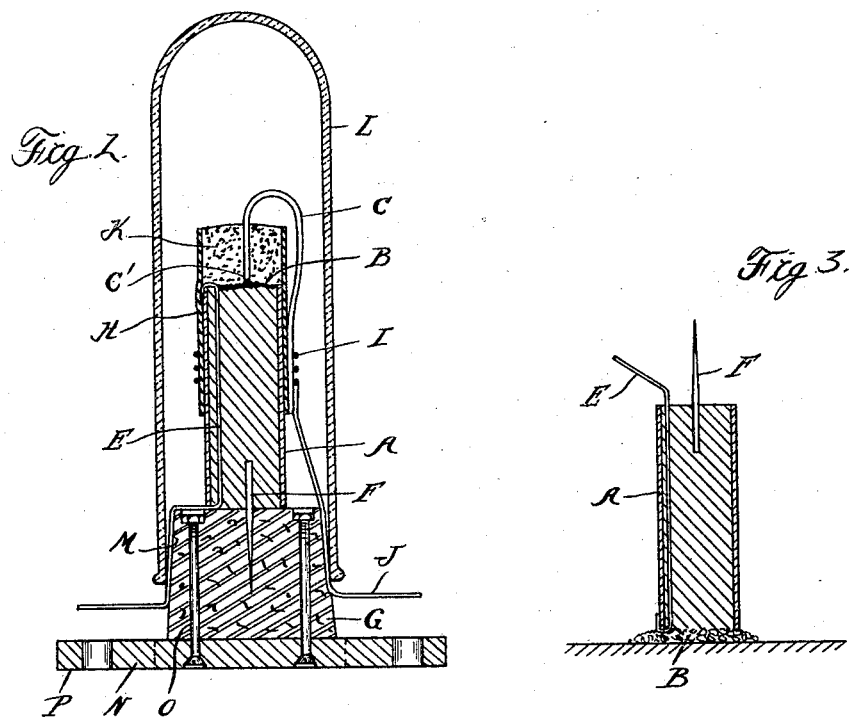
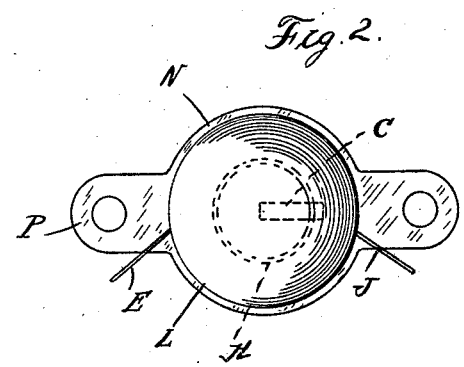
Inventor
Andrew H. Miller
Attorneys Patented June 1, 1926.

1,586,828

UNITED STATES PATENT OFFICE.

ANDREW H. MILLER, OF DETROIT, MICHIGAN.

RADIODETECTOR.

Application filed November 26, 1923. Serial No. 677,154.

The invention relates to radio detectors of the crystal type and consists in certain novel features of construction as hereinafter set forth.

The primary object of the invention is to obtain a simple form of detector which is permanently adjusted to receive the radio waves, thereby eliminating the necessity of continual manipulation of the detecting unit as is usually necessary with the ordinary crystal detectors used in receiving sets.

In the drawings:—

Figure 1 is a longitudinal section through the detector;

Figure 2 is a transverse view; and

Figure 3 is a longitudinal section through a portion of the apparatus showing the method of embedding the crystals into the supporting tube.

A is a tubular member filled with a conducting material in which one or more detecting crystals B are embedded. C is a wire or pointer of conducting material supported on the tube A but insulated therefrom and arranged to contact with the crystal B at a sensitive point. This point may be found by adjusting the pointer C while the apparatus is connected in a radio receiving set until the signals are very clearly audible. When such adjustment has been obtained the needle is maintained in fixed relation with the crystal by applying a cementitious material of an insulating nature which, upon hardening, prevents any relative movement of the needle and crystal.

As specifically shown my construction comprises a number of small crystalline particles of iron pryrites embedded in a low fusing alloy and is preferably made up, as shown in Figure 3, by placing the tube A in a container for the pulverulent crystalline mass and pouring the molten alloy D in the tube. A lead wire E is also placed in the tube A and also a pin F in such a manner that when the molten alloy sets it will form a mechanical structure containing a layer of crystalline material which is electrically connected to the lead wire E. The structure is then placed upon a suitable base, such as a cork G, by inserting the pin F thereinto and an insulating tube H placed over the tube A in such a manner as to project above the crystalline layer B. The pointer C of a conducting material, such as strip bronze, is secured to the tube H by a wire I wound therearound and the end J of the wire forms the second terminal of the detector. The pointer is preferably bent in the form of a U and the free end C' placed in contact with the crystalline material B and adjusted to make contact with a sensitive point of the crystalline mass. The cementitious material K is then placed in the projecting end of the tube H surrounding the return-bent portion of the pointer C and upon the setting of this material the pointer is permanently held in contact with a sensitive point of the crystal.

The detector is provided with a tubular casing L preferably of glass which fits over the base G while the terminal wires E and J are brought through longitudinal slots M in the base. For mounting the instrument in a receiving set it is also preferable to provide a plate N secured to the base G by bolts O and provided with apertured ears P.

While I have described a specific construction of simple form it is obvious that many modifications may be employed for accomplishing the same purpose. For example, a single crystal may be used instead of the crystalline mass described. The essential feature of my device is that the detecting crystal and the cooperating pointer are permanently held in a fixed relation by a cementitious material, thus eliminating the necessity for continual adjustment in order to maintain the detector in operative condition.

What I claim as my invention is:—

A radio detector comprising a tubular container filled with a low fusing alloy, a crystal embedded in said alloy at one end of said container, a pin projecting from the other end, an insulating tube sleeved on said container and projecting above said crystal, a U-shaped conductor having one end secured to said tube and the other end contacting with said crystal, insulating cementitious filling within said tube above said crystal for permanently holding said conductor in contact with said crystal, a supporting member for receiving the projecting portion of said pin, and a tubular container secured to said supporting member surrounding said tubular container and spaced therefrom.

In testimony whereof I affix my signature.

ANDREW H. MILLER.